US010045302B2

(12) United States Patent
Barriac et al.

(10) Patent No.: US 10,045,302 B2
(45) Date of Patent: Aug. 7, 2018

(54) POWER CONTROL IN WIRELESS NETWORKS (71) Applicant: QUALCOMM Incorporated, San Diego, CA (US)

(72) Inventors: Gwendolyn Denise Barriac, Encinitas, CA (US); George Cherian, San Diego, CA (US); Simone Merlin, Solana Beach, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/853,854

(22) Filed: Sep. 14, 2015

(65) Prior Publication Data
US 2016/0081031 A1 Mar. 17, 2016

Related U.S. Application Data (60) Provisional application No. 62/051,097, filed on Sep. 16, 2014.

(51) Int. Cl.
H04W 52/02 (2009.01)
H04L 12/26 (2006.01)
(Continued)

(52) U.S. Cl.
CPC ....... *H04W 52/0261* (2013.01); *H04L 1/0003* (2013.01); *H04L 43/16* (2013.01);
(Continued)

(58) Field of Classification Search
CPC ...... H04L 1/0003; H04L 43/16; H04W 24/10; H04W 52/0261; H04W 52/241;
(Continued)

(56) References Cited

U.S. PATENT DOCUMENTS 7,526,308 B2   4/2009  Guo et al.
7,801,546 B2   9/2010  Yang et al.
(Continued)

FOREIGN PATENT DOCUMENTS

WO       2014071308 A1    5/2014

OTHER PUBLICATIONS

Howitt I., et al., "IEEE 802.15.4 Low Rate—Wireless Personal Area Network Coexistence Issues," IEEE Wireless Communications and Networking (WCNC), 2003, vol. 3, pp. 1481-1486.
(Continued)

Primary Examiner — Robert J Lopata
(74) Attorney, Agent, or Firm — Arent Fox, LLP (57) ABSTRACT A method, an apparatus, and a computer-readable medium for wireless communication are provided. In one aspect, the apparatus is configured to measure an energy level of a transmission channel. The apparatus is configured to compare the measured energy level to a first threshold energy level. The first threshold energy level corresponds to a first state of the transmission channel. The apparatus is configured to determine whether to transmit data in the transmission channel based on the comparison. The apparatus is configured to reduce a transmission power of the apparatus and transmit the data in the transmission channel at the reduced transmission power when the measured energy level is greater than the first threshold energy level.

28 Claims, 6 Drawing Sheets (51) Int. Cl.
  *H04W 24/10* (2009.01)
  *H04L 1/00* (2006.01)
  *H04W 52/24* (2009.01)
  *H04W 52/28* (2009.01)
  *H04W 84/12* (2009.01)
  *H04W 52/26* (2009.01)
  *H04W 52/44* (2009.01)

(52) U.S. Cl.
  CPC ......... *H04W 24/10* (2013.01); *H04W 52/245* (2013.01); *H04W 52/28* (2013.01); *H04W 52/241* (2013.01); *H04W 52/262* (2013.01); *H04W 52/44* (2013.01); *H04W 84/12* (2013.01); *Y02D 70/00* (2018.01); *Y02D 70/142* (2018.01)

(58) Field of Classification Search
  CPC . H04W 52/245; H04W 52/262; H04W 52/28; H04W 52/44; H04W 84/12; H04W 52/02; H04W 52/0203; Y02B 60/50
  USPC .......................................................... 370/311
  See application file for complete search history.

(56) References Cited

U.S. PATENT DOCUMENTS

| | | | |
|---|---|---|---|
| 2006/0092889 A1* | 5/2006 | Lyons | H04W 16/08 370/338 |
| 2010/0067473 A1 | 3/2010 | Cave et al. | |
| 2011/0116489 A1 | 5/2011 | Grandhi | |
| 2012/0250532 A1* | 10/2012 | Husted | H04W 74/0808 370/252 |
| 2014/0098681 A1* | 4/2014 | Stager | H04W 24/02 370/252 |
| 2015/0071270 A1* | 3/2015 | Harel | H04W 72/0413 370/338 |
| 2015/0085729 A1* | 3/2015 | Majjigi | H04W 52/12 370/311 |
| 2015/0163824 A1* | 6/2015 | Krzymien | H04W 28/18 370/338 |
| 2015/0319700 A1* | 11/2015 | Oteri | H04W 52/28 455/127.1 |
| 2015/0373652 A1* | 12/2015 | Dabeer | H04W 52/246 455/522 |
| 2016/0021661 A1* | 1/2016 | Yerramalli | H04W 16/14 370/329 |
| 2016/0037560 A1* | 2/2016 | Liu | H04L 51/34 370/329 |
| 2016/0081056 A1* | 3/2016 | Barriac | H04L 43/0882 370/252 |
| 2016/0095039 A1* | 3/2016 | Valliappan | H04W 36/14 370/332 |
| 2016/0165555 A1* | 6/2016 | Jeong | H04W 52/243 455/447 |

OTHER PUBLICATIONS

International Search Report and Written Opinion—PCT/US2015/050215—ISA/EPO—dated Oct. 26, 2015.

Marinier P, et al., "Power Control in 802.11 Wireless LANs", 2006 IEEE 64th Vehicular Technology Conference : VTC 2006-Fall ; Sep. 25-28, 2006, Montreal, Quebec, Canada, Piscataway, NJ : IEEE Operations Center, Sep. 1, 2006 (Sep. 1, 2006), pp. 1-5, XP031051556, ISBN: 978-1-4244-0062-1 the whole document.

N/A: "Tpc Edt Kwak Rudolf ; 11-05-0498-00-000v-tpc-edt-kwak-rudolf", IEEE Draft; 11-05-0498-00-000V-TPC-EDT-Kwak-Rudolf, IEEE-SA Mentor, Piscataway, NJ USA, vol. 802.11v, May 19, 2005 (May 19, 2005), pp. 1-10, XP017689123, [retrieved on May 19, 2005].

* cited by examiner

POWER CONTROL IN WIRELESS NETWORKS

CROSS-REFERENCE TO RELATED APPLICATION(S)

This application claims the benefit of U.S. Provisional Application Ser. No. 62/051,097, entitled "Power Control in Wireless Networks" and filed on Sep. 16, 2014, which is expressly incorporated by reference herein in its entirety.

BACKGROUND

Field

The present disclosure relates generally to communication systems, and more particularly, to regulating the transmission power of access points and stations in a wireless network based on clear channel assessment energy detection.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer program products, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus for wireless communication. The apparatus is configured to measure an energy level of a transmission channel. The apparatus is configured to compare the measured energy level to a first threshold energy level. The first threshold energy level corresponds to a first state of the transmission channel. The apparatus is configured to determine whether to transmit data in the transmission channel based on the comparison. When the measured energy level is greater than the first threshold energy level, the apparatus is configured to reduce a transmission power of the wireless device and to transmit the data in the transmission channel at the reduced transmission power

DETAILED DESCRIPTION

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
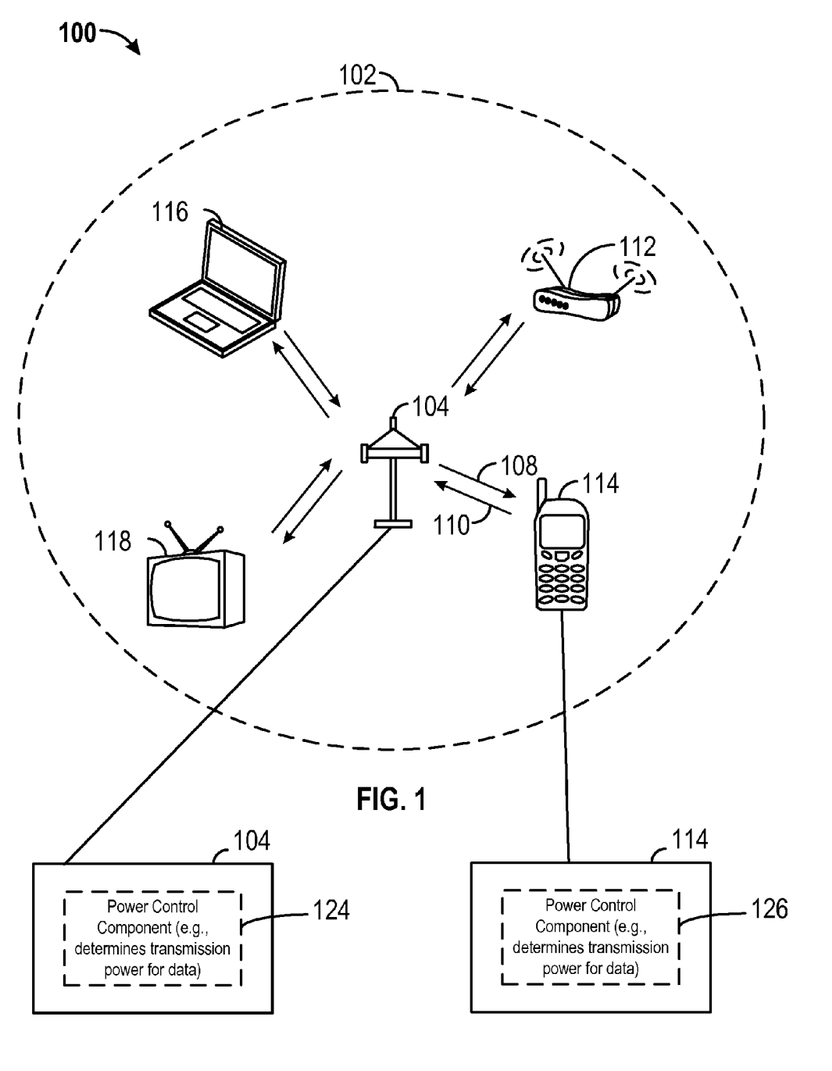
FIG. 1 shows an example wireless communication system in which aspects of the present disclosure may be employed.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a power control component 124 to perform procedures related to controlling the transmission power of the AP 104. In this example, the power control component 124 may be configured to measure an energy level of a transmission channel used by the AP 104. The power control component 124 may be configured to compare the measured energy level to a first threshold energy level, in which the first threshold energy level corresponds to a first state of the transmission channel. The power control component 124 may be configured to determine whether to transmit data in the transmission channel to a STA (e.g., STA 114), or another AP, based on the comparison. In this example, when the measured energy level is greater than the first threshold energy level, the power control component 124 may be configured to reduce a transmission power of the AP 104 and transmit the data in the transmission channel at the reduced transmission power.

In another aspect, the STA 114 may include one or more components for performing various functions. For example, the STA 114 may include a power control component 126 to perform procedures related to controlling the transmission power of the STA 114. In this example, the power control component 126 may be configured to measure an energy level of a transmission channel used by the STA 114. The power control component 126 may be configured to compare the measured energy level to a first threshold energy level, in which the first threshold energy level corresponds to a first state of the transmission channel. The power control component 126 may be configured to determine whether to transmit data in the transmission channel to an AP (e.g., AP 104), or another STA, based on the comparison. In this example, when the measured energy level is greater than the first threshold energy level, the power control component 126 may be configured to reduce a transmission power of the STA 114 and transmit the data in the transmission channel at the reduced transmission power.

Figure 2:
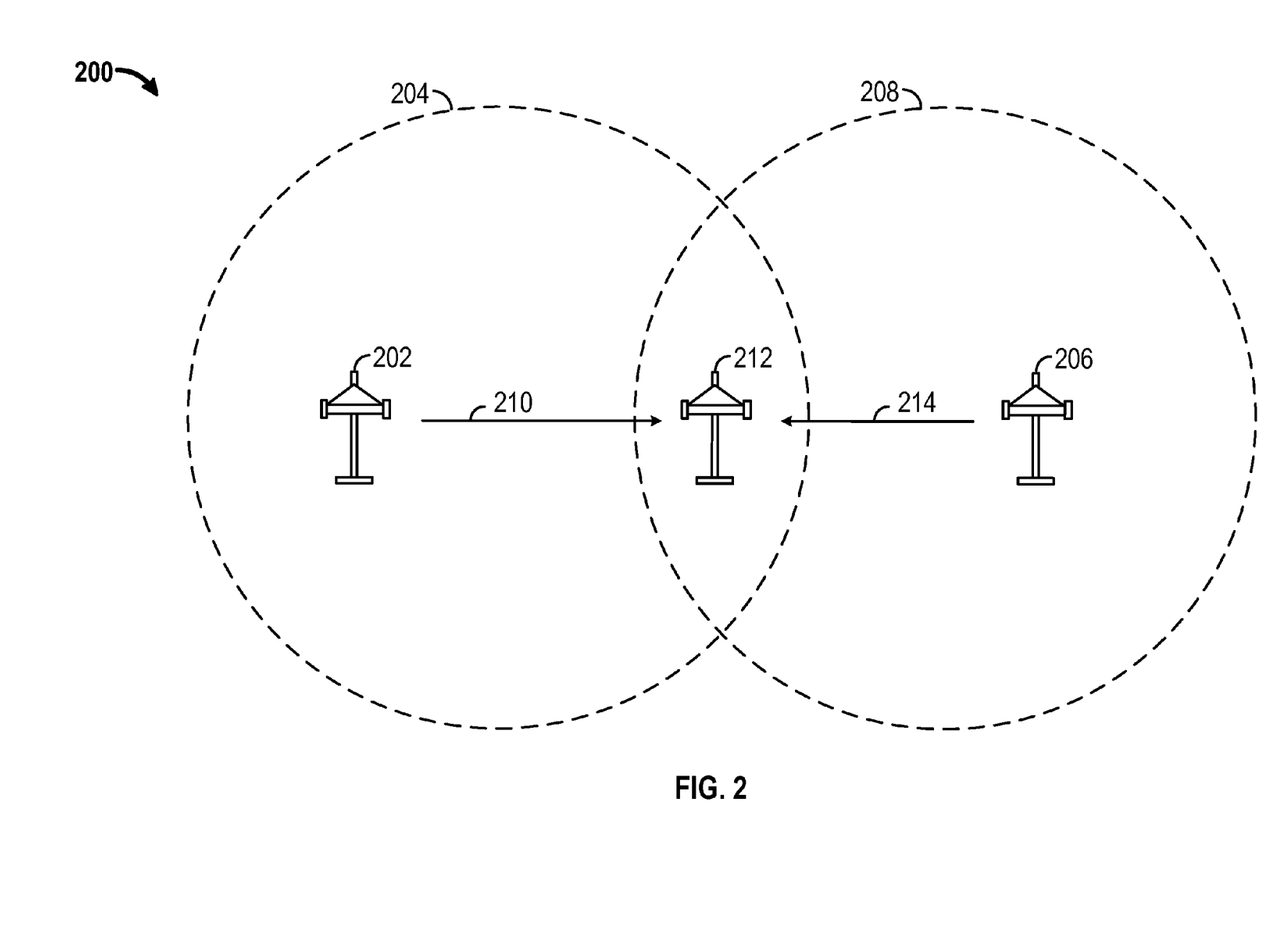
FIG. 2 is a diagram of a wireless network.

FIG. 2 is a diagram 200 of a wireless network (e.g., a Wi-Fi network). The diagram 200 illustrates an AP 202 broadcasting/transmitting within an energy deferral area 204 and an AP 206 broadcasting/transmitting within an energy deferral area 208. In other words, when the AP 202 transmits, all devices within the energy deferral area 204 must defer. An AP 212 is located in both energy deferral areas 204, 208. In a Wi-Fi network, wireless devices such as APs (and STAs) may perform a clear channel assessment (CCA) to determine whether a transmission channel is busy or idle for purposes of determining whether data may be transmitted to another wireless device.

A CCA has two components: carriers sense (CS) and energy detection (ED). Carrier sense refers to an ability of a wireless device (e.g., AP or STA) to detect and decode incoming Wi-Fi signal preambles, signals which enable the receiver to acquire a wireless signal from and synchronize with the transmitter, from other wireless devices. For example, the AP 202 may broadcast a Wi-Fi signal preamble 210, and the Wi-Fi signal preamble 210 may be detected by the AP 212 located within range of the Wi-Fi signal preamble 210. Similarly, the AP 206 may broadcast a Wi-Fi signal preamble 214, and the Wi-Fi signal preamble 214 may be detected by the AP 212. When the AP 212 detects one or more of the Wi-Fi signal preambles 210, 214, the AP 212 may determine that the transmission channel is busy and not transmit data. The CCA may remain busy for the length of a transmission frame associated with the Wi-Fi signal preambles 210 and/or 214.

The second component of CCA is energy detection, which refers to the ability of a wireless device to detect an energy level present on a transmission channel. The energy level may be based on different interference sources, Wi-Fi transmissions, a noise floor, and/or ambient energy. Wi-Fi transmissions may include unidentifiable Wi-Fi transmissions that have been corrupted or are so weak that the transmission can no longer be decoded. Unlike carrier sense, in which the exact length of time for which a transmission channel is busy may be known, energy detection uses periodic sampling of a transmission channel to determine if the energy still exists. Additionally, energy detection requires at least one threshold used to determine whether the reported energy level is adequate to report the transmission channel as busy or idle. This energy level may be referred to as the ED threshold level or the CCA sensitivity level. When the reported energy level is equal to or above the ED threshold level, then the transmission channel may be determined to be busy and not idle. But if the reported energy level is below the ED threshold level, then the transmission channel may be determined to be idle.

Referring back to FIG. 2, in an example, the AP 202 and the AP 206 are outside each other's energy deferral areas and thus may not detect energy from one another. The AP 202 and the AP 206 may also be far enough apart that the AP 202 and the AP 206 do not hear each other's preambles (e.g., the Wi-Fi signal preambles 210, 214). As such, the AP 202 and the AP 206 can transmit concurrently. However, the AP 212 is within both the energy deferral areas 204, 208 corresponding to the APs 202, 206, respectively. That is, the AP 212 detects energy levels from both the AP 202 and the AP 206.

When the AP 202 and/or the AP 205 are transmitting, the AP 212 may measure the energy level and determine that the energy level is above an ED threshold level (or CCA sensitivity level). Because the energy level is above the ED threshold level, the AP 212 may not transmit. In this example, because the AP 212 is within the service areas of two APs that may concurrently transmit, the AP 212 may become starved of resources and not be able to transmit. Although FIG. 2 uses APs as an example, STAs, or a mix of APs and STAs could have also been used. For example, the APs 202, 206, 212 could have been STAs. Alternatively, the AP 212 could have been a STA while the AP 202 and 206 remained the same.

It is often helpful to increase the reuse of transmission channels (e.g., increase the number of devices transmitting at the same time) in a dense Wi-Fi network/system that has overlapping BSSs (OBSSs), such as in FIG. 2, as long as increasing the reuse of transmission channels can be done without causing too much interference. While some solutions for increasing reuse rely on hearing preambles from other APs (or OBSS preambles), a solution based on the detected energy level is needed because, in some instances, preambles may be not be successfully decoded.

Figure 3:
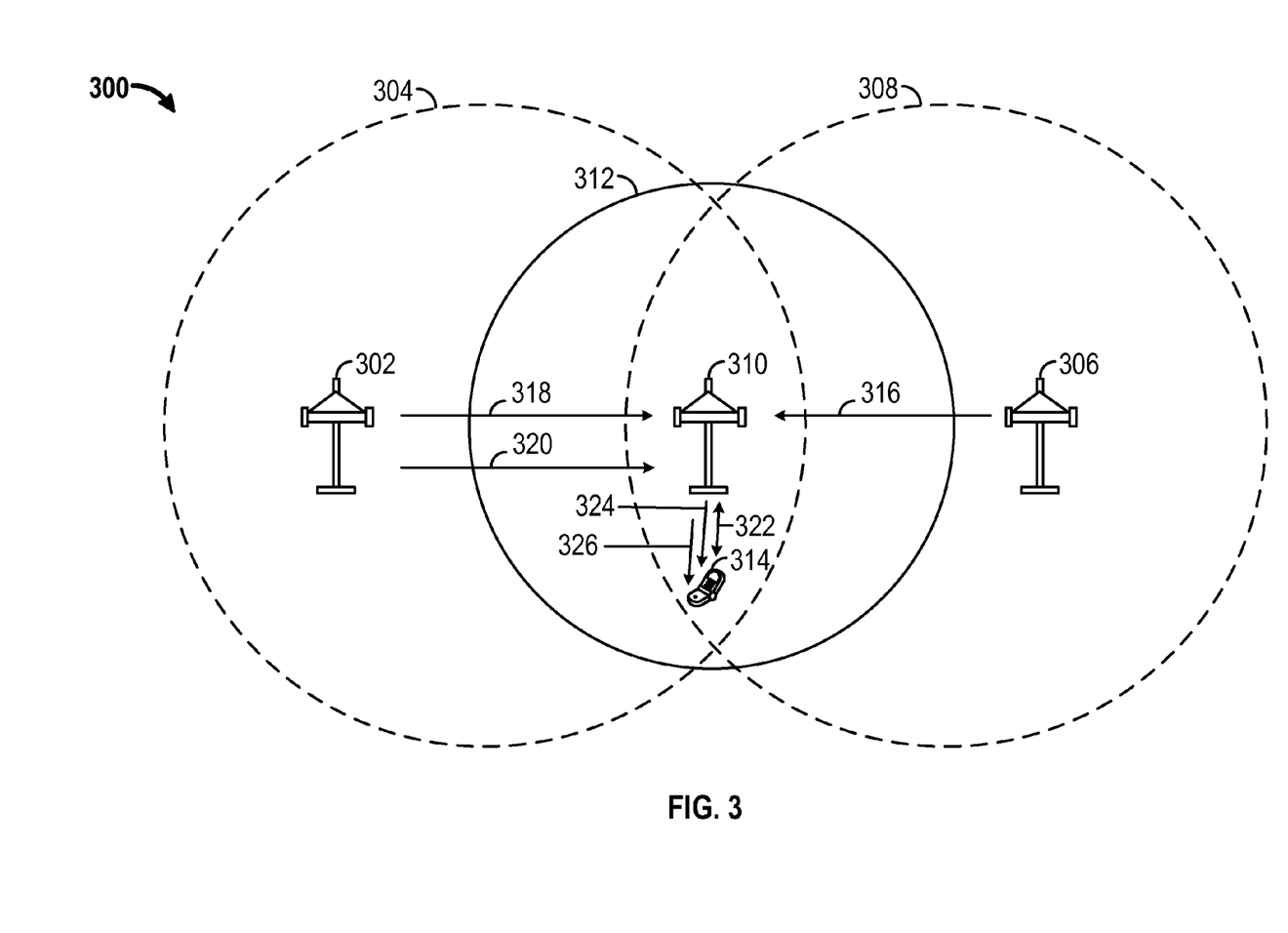
FIG. 3 is an exemplary diagram of an energy level-based method for power control in a wireless network.

FIG. 3 is an exemplary diagram 300 of an energy level-based method for power control in a wireless network. The diagram 300 illustrates an AP 302 broadcasting/transmitting within an energy deferral area 304 and an AP 306 broadcasting/transmitting within an energy deferral area 308. An AP 310 is located in both energy deferral areas 304, 308 in which the AP 302, 306, respectively, are broadcasting/transmitting. When the AP 310 has data 322 to transmit to a STA 314, for example, the AP 310 may measure an energy level of a transmission channel on which the AP 310 wants to transmit. The energy level of the transmission channel may be measured by measuring the energy level of different interference sources and/or Wi-Fi transmissions. The measurement may also be based on an existing noise floor and/or ambient energy. In one aspect, the measurements may be performed periodically (e.g., every 9 microseconds). The AP 310 may compare the measured energy level of the transmission channel to a first threshold energy level (e.g., −62 dB) to determine if the transmission channel is busy. The first threshold energy level may correspond to a first state of the transmission channel (e.g., the transmission channel is not idle, but additional transmissions may be supported). In an aspect, the first threshold energy level may correspond to an ED threshold level at which a wireless device may typically refrain from transmitting when the measured energy level is at or above the ED threshold level. For example, in FIG. 2, if the AP 212 determined that the measured energy level of the transmission channel was above the first threshold energy level (e.g., the ED threshold level), the AP 212 would refrain from transmitting. However, in FIG. 3, to increase reuse, when the measured energy level is greater than the first threshold energy level (e.g., the ED threshold level), the AP 310 may still be allowed to transmit by reducing the transmission power and by transmitting the data in the transmission channel at the reduced transmission power. Given the reduced transmission power, the data transmitted by the AP 310 may only be received within a service area 312. In one configuration, the service area 312 may not encompass the APs 302 or 306. In an aspect, the service area 312 may be smaller than the energy deferral areas 304 and 308. Although the reducing the transmission power may result in a smaller service area, the AP 310 may not be starved of an opportunity to transmit data to the STA 314 as would be the case in FIG. 2, for example.

In one configuration, the amount by which the transmission power is reduced may be a function of a difference between the measured energy level and the first threshold energy level. In one aspect, the reduction in transmission power may be calculated based on $f(x)=\alpha*(x-EDlevel)$ when $x \geq EDlevel$. In this aspect, $f(x)$ corresponds to the reduction in transmission power, x is the measured energy level, EDlevel is the first threshold energy level (e.g., ED threshold level), and $\alpha$ is a number greater than 0. In one example, the measured energy level may be −60 dB. In this example, assuming an EDlevel of −62 dB and an $\alpha$ equal to 1, the transmission power will be reduced by 2 dB. In another aspect, if the measured energy level x is less than the EDlevel, the transmission power may not be reduced, and the AP 310 may transmit data to the STA 314 at an initial/default transmission power.

In another configuration, the transmission channel may be so congested that, even with the reduced transmission power, the AP 310 cannot reliably transmit data to the STA 314. In this configuration, the AP 310 may compare the measured energy level to a second threshold energy level, which corresponds to a second state of the transmission channel (e.g., the transmission channel is too congested and may no longer support any additional data transmissions). The second threshold energy level may be greater than the first threshold energy level (e.g., −50 dB). In one aspect, when the measured energy level is greater than the first threshold energy level and less than the second threshold energy level, the AP 310 may transmit the data to the STA 314 at a reduced transmission power. However, when the measured energy level is greater than the second threshold energy level, the AP 310 may refrain from transmitting the data in the transmission channel to the STA 314.

In another configuration, the determination of whether to transmit data to the STA 314 at a reduced transmission power may be based in part on a signal to interference plus noise ratio (SINR) at the STA 314. For example, the AP 310 may determine a SINR at the STA 314 based on a calculated pathloss based on received signal strength indication (RSSI) measurements from transmissions (e.g., acknowledgement messages) or feedback sent by the STA 314. The SINR may also be determined based on measured or reported interference. If the SINR is less than a threshold (e.g., a threshold of 8), the AP 310 may refrain from transmitting the data at the reduced transmission power. However, if the SINR is greater than the threshold, the AP 310 may transmit the data in the transmission channel at the reduced transmission power.

Similarly, in yet another configuration, the determination of whether to transmit data to the STA 314 at a reduced transmission power may be based in part on an expected modulation and coding scheme (MCS) index at the STA 314. The expected MCS index relates to the data rate at which the STA 314 is receiving the data transmission. For example, the AP 310 may determine an expected MCS index at the STA 314 (which may be a function of the AP 310's transmit power). If the expected MCS index is greater than a threshold (e.g., a threshold of 2), the AP 310 may determine to transmit data to the STA 314 at the reduced transmission power. However, if the expected MCS index is less than the threshold, the AP 310 may refrain from transmitting the data to the STA 314.

In another configuration, the measured energy level may be so much higher than the ED threshold level that the corresponding reduction in transmission power will be too severe and any transmission at the severely reduced transmission power would be impractical. In one aspect, the AP 310 may compare the reduced transmission power (calculated, for example, according to the function previously described) to a minimum power threshold. If the reduced transmission power is greater than or equal to the minimum power threshold (e.g., 0 dB), the AP 310 may transmit the data to the STA 314 at the reduced transmission power. However, if the reduced transmission power is less than the minimum transmission power, the AP 310 may refrain from transmitting the data to the STA 314 at the reduced transmission power. In one aspect, the AP 310 may transmit the data at the reduced transmission power only when the reduced transmission power is greater than the minimum power threshold. For example, if the reduced transmission power is −5 dBm and the minimum power threshold is 0 dBm, the AP 310 will not transmit the data.

In another configuration, the determination of whether to transmit data to the STA 314 may be based on the measured energy level alone. As such, even when the AP 310 receives a Wi-Fi signal preamble 316, for example, from the AP 306 which is in an OBSS, the AP 310 may ignore the Wi-Fi signal preamble 316 and base the determination of whether to transmit data on the measured energy level.

In one configuration, the first threshold energy level and the second threshold energy level may be preconfigured within the AP 310. In another configuration, the AP 310 may receive the first threshold energy level and/or the second threshold energy level in a first message 318 from another AP (e.g., the AP 302). For example, the AP 310 may be preconfigured with the first threshold energy level and may receive the second threshold energy level in a beacon message from the AP 302. In an aspect, the AP 310 may be preconfigured with the first threshold energy level and receive a first message 318 from the AP 302 with an updated first threshold energy level that may be higher or lower than the preconfigured first threshold energy level. Several APs within OBSSs may receive updated threshold energy levels within a same period of time.

In yet another configuration, the AP 310 may receive a second message 320 from the AP 302 (the first message 318 does not need be received before the second message 320). The second message 320 from the AP 302 may instruct the AP 310 to operate in a reduced power mode when the measured energy level is greater than the first threshold energy level. In this configuration, the AP 310 may operate, initially, in normal mode in which the AP 310 refrains from transmitting the data 322 to the STA 314 when the measured energy level is greater than the first threshold energy level. Upon receiving the second message 320 from the AP 302, however, the AP 310 may determine to reduce the transmit power and transmit data to the STA 314 at the reduced transmission power. In one aspect, the second message 320 instructing the AP 310 to operate in a reduced power mode may be combined with the first message 318, such that the first message 318 both contains an updated first threshold energy level (and/or second threshold energy level) and instructs the AP 310 to operate in a reduced power mode. As stated previously, the amount of reduction in transmission power may be a function of the difference between the measured energy level and the ED threshold level.

Although the power reduction methods in FIG. 3 have been discussed with respect to APs, a STA (e.g., the STA 314) may perform any of the above-mentioned functions and/or methods as well. In one configuration, the STA 314 may measure an energy level of a transmission channel, compare the measured energy level to a first threshold energy level that corresponds to a first state of the transmission channel, and determine whether to transmit data 322 in the transmission channel to an AP (or another STA) based on the comparison. In one aspect, the STA 314 may be preconfigured with the first threshold energy level and the second threshold energy level. In another configuration, the STA 314 may receive the first threshold energy level and/or the second threshold energy level in a third message 324 from an AP (e.g., the AP 310 within STA 314's BSS). For example, the STA 314 may be preconfigured with the first threshold energy level and may receive the second threshold energy level in a beacon message or a management frame from the AP 310. In another aspect, the STA 314 may be preconfigured with the first threshold energy level and receive a third message 324 from the AP 310 with an updated first threshold energy level that may be higher or lower than the preconfigured first threshold energy level. Other STAs (not pictured) within the BSSs may receive updated threshold energy levels within a same period of time. In one aspect, the AP 310 may be broadcast messages and change the first and/or second energy thresholds of multiple STAs at the same time.

In yet another configuration, the STA 314 may receive a fourth message 326 from the AP 310 (the third message 324 does not need be received before the fourth message 326). The fourth message 326 from the AP 310 may instruct the STA 314 to operate in a reduced power mode when the measured energy level is greater than the first threshold energy level. In this configuration, the STA 314 may operate, initially, in normal mode in which the STA 314 refrains from transmitting the data 322 to the AP 310 when the measured energy level is greater than the first threshold energy level. Upon receiving the fourth message 326 from the AP 310, however, the STA 314 may determine to reduce the transmit power and transmit the data 322 to the AP 310 at the reduced transmission power (subject to possible additional constraints as previously discussed). In one aspect, the fourth message 326 instructing the STA 314 to operate in a reduced power mode may be combined with the third message 324, such that the third message 324 both contains an updated first threshold energy level (and/or second threshold energy level) and instructs the STA 314 to operate in a reduced power mode. In an aspect, the messages from the AP may be broadcast and may be used to indicate to all the STAs in the BSS to operate in the reduced power mode when the measured energy level is greater than the first energy threshold. The reduced power mode can also include additional constraints on the transmissions at reduced power as discussed above.

Figure 4:
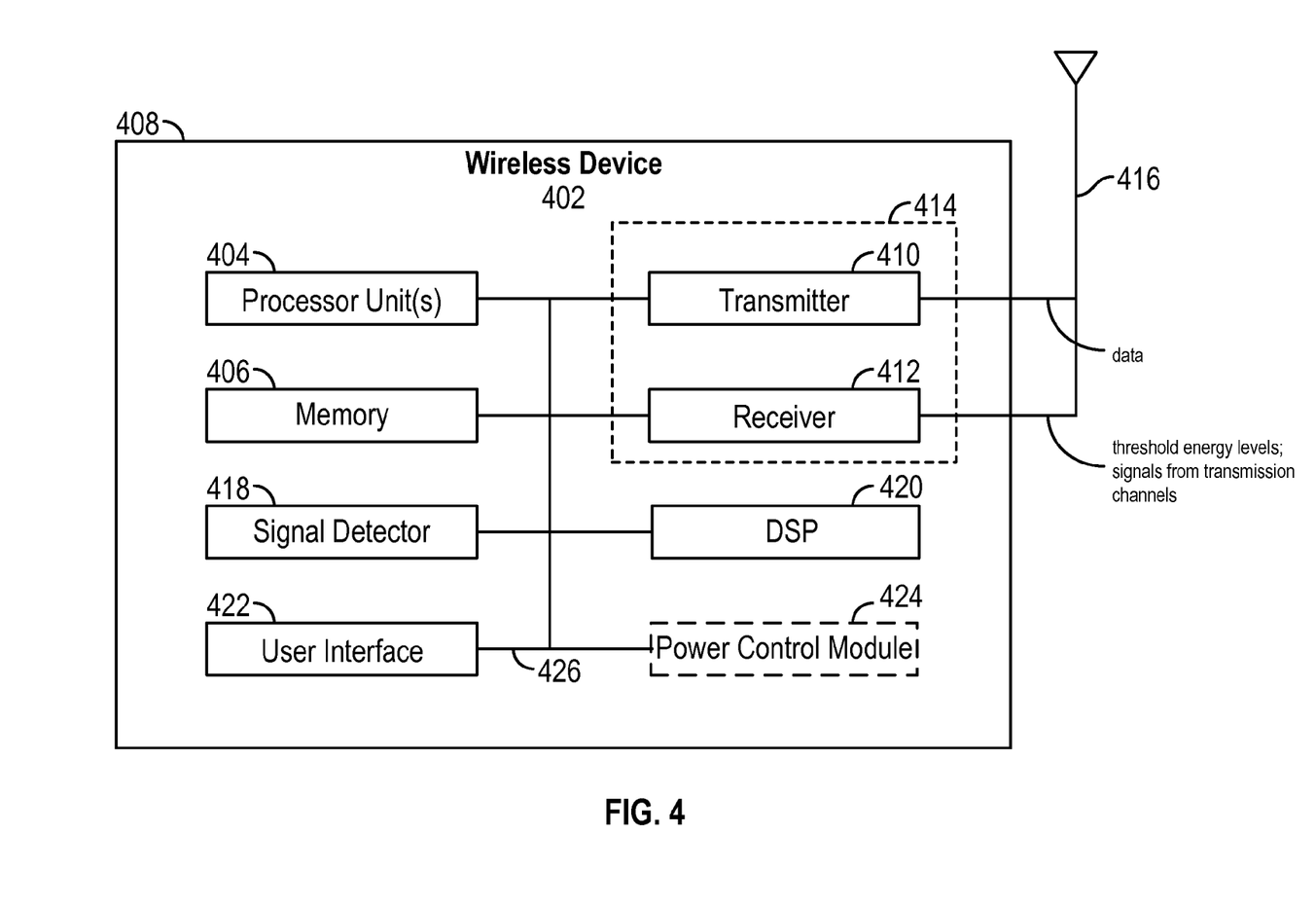
FIG. 4 shows a functional block diagram of an example wireless device that may be employed within the wireless communication system of FIG. 1.

FIG. 4 shows an example functional block diagram of a wireless device 402 that may be employed within the wireless communication system 100 of FIG. 1. The wireless device 402 is an example of a device that may be configured to implement the various methods described herein. For example, the wireless device 402 may comprise the AP 104 or one of the STAs 112, 114, 116, and 118.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable (by the processor 404, for example) to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408, and the wireless device 402 may include a transmitter 410 and/or a receiver 412 to allow transmission and reception of data between the wireless device 402 and a remote device. The transmitter 410 and the receiver 412 may be combined into a transceiver 414. An antenna 416 may be attached to the housing 408 and electrically coupled to the transceiver 414. The wireless device 402 may also include multiple transmitters, multiple receivers, multiple transceivers, and/or multiple antennas.

The wireless device 402 may also include a signal detector 418 that may be used to detect and quantify the level of signals received by the transceiver 414 or the receiver 412. The signal detector 418 may detect such signals as total energy, energy per subcarrier per symbol, power spectral density, and other signals. The wireless device 402 may also include a DSP 420 for use in processing signals. The DSP 420 may be configured to generate a packet for transmission. In some aspects, the packet may comprise a physical layer convergence protocol (PLCP) protocol data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

When the wireless device 402 is implemented as an AP (e.g., AP 104, AP 310) or as a STA (e.g., STA 114 or STA 314), the wireless device 402 may also comprise a power control component 424. The power control component 424 may be configured to measure an energy level of a transmission channel. The power control component 424 may be configured to compare the measured energy level to a first threshold energy level. The first threshold energy level may correspond to a first state of the transmission channel. The power control component 424 may be configured to determine whether to transmit data, via the transmitter 410 or transceiver 414, in the transmission channel based on the comparison. In one aspect, when the measured energy level is less than or equal to the first threshold energy level, the power control component 424 may be configured to transmit the data at in initial transmission power. In another aspect, when the measured energy level is greater than the first threshold energy level, the power control component 224 may reduce a transmission power of the wireless device 402 and transmit the data in the transmission channel at the reduced transmission power. In one configuration, the reduced transmission power may be a function of a difference between the measured energy level and the first threshold energy level.

In another configuration, the power control component 424 may be further configured to compare the measured energy level to a second threshold energy level. The second threshold energy level may correspond to a second state of the transmission channel. The second threshold energy level may be greater than the first threshold energy level. In one aspect, when the measured energy level is greater than the first threshold energy level and less than the second threshold energy level, the power control component 424 is configured to transmit the data via the transmitter 410 or the receiver 412 in the transmission channel at the reduced transmission power. In another aspect, when the measured energy level is greater than the second threshold energy level, the power control component 424 is configured to refrain from transmitting the data in the transmission channel.

In another configuration, the power control component 424 may be configured to determine a SINR at a second wireless device to which the data is to be transmitted. The power control component 424 may be configured to transmit the data, via the transmitter 410 or the transceiver 414, in the transmission channel at the reduced transmission power when the SINR is greater than a threshold and when the measured energy level is greater than the first threshold energy level but less than the second threshold energy level.

Similarly, in yet another configuration, the power control component 424 may be configured to determine an expected MCS index at the second wireless device to which the data is to be transmitted. The power control component 424 may be configured to transmit the data, via the transmitter 410 or the transceiver 414, in the transmission channel at the reduced transmission power when the expected MCS index is greater than a threshold and when the measured energy level is greater than the first threshold energy level but less than the second threshold energy level.

In another configuration, the power control component 424 may be configured to compare the reduced transmission power to a minimum power threshold. The power control component 424 may be configured to transmit the data, via the transmitter 410 or the transceiver 414, at the reduced transmission power when the reduced transmission power is greater than the minimum power threshold.

In another configuration, the power control component 424 may be configured to determine whether to transmit the data based on the measured energy level even when a Wi-Fi signal preamble is received from another wireless device. In one aspect, the other wireless device may be in an OBSS. In yet another configuration, the power control component 424 may be configured to receive, via the receiver 412 or the transceiver 414, at least one of the first threshold energy level or the second threshold energy level in a message from an AP (or another network device). In yet another configuration, the power control component 424 may be configured to receive, via the receiver 412 or the transceiver 414, a message from an AP (or another network device). The message may include at least one of the first threshold energy level, the second threshold energy level, or instructions for the power control component 424 to operate in a reduced power mode when the measured energy level is greater than the first threshold energy level and when either the SINR or MCS index is greater than a respective threshold. In an aspect, the message may be received in a beacon message or a management frame.

The various components of the wireless device 402 may be coupled together by a bus system 426. The bus system 426 may include a data bus, for example, as well as a power bus, a control signal bus, and a status signal bus in addition to the data bus. Components of the wireless device 402 may be coupled together or accept or provide inputs to each other using some other mechanism.

Although a number of separate components are illustrated in FIG. 4, one or more of the components may be combined or commonly implemented. For example, the processor 404 may be used to implement not only the functionality described above with respect to the processor 404, but also to implement the functionality described above with respect to the signal detector 418, the DSP 420, the user interface 422, and/or the power control component 424. Further, each of the components illustrated in FIG. 4 may be implemented using a plurality of separate elements.

Figure 5:
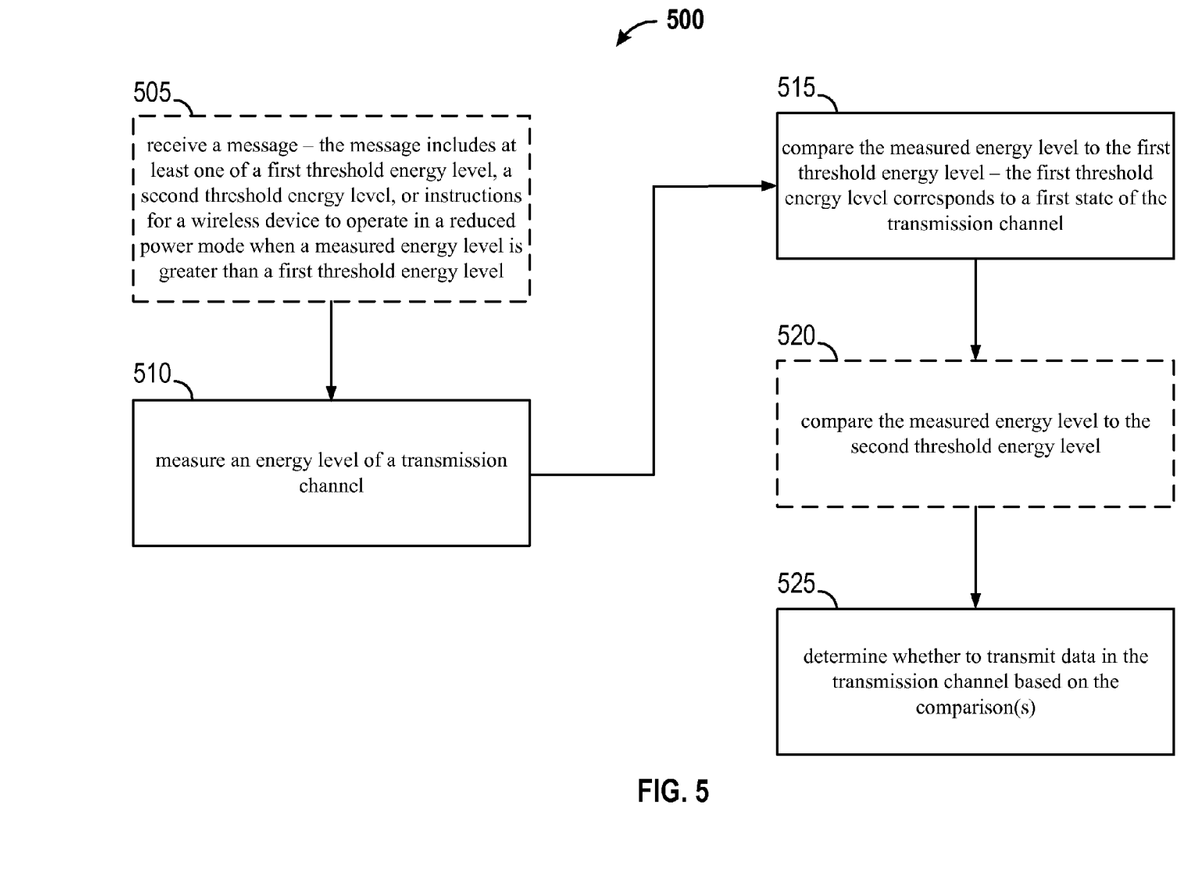
FIG. 5 is a flowchart of an example method of wireless communication for power control.

FIG. 5 is a flowchart of an example method 500 of wireless communication for power control. The method 500 may be performed using an apparatus (e.g., the AP 104, the AP 310, the STA 114, the STA 314, or the wireless device 402, for example). Although the method 500 is described below with respect to the elements of wireless device 402 of FIG. 4, other components may be used to implement one or more of the steps described herein. The dotted lines with respect to the various blocks represent optional blocks.

At block 505, the apparatus may receive a message. In aspect, the message may include at least one of a first threshold energy level, a second threshold energy level, or instructions for the apparatus to operate in a reduced power mode when a measured energy level is greater than a first threshold energy level. In one example, referring to FIG. 3, the AP 310 may receive a first message 318 from the AP 302, and the first message 318 may include a first threshold energy level and/or a second threshold energy level. The AP 310 may be preconfigured with the second threshold energy level. In one example, the AP 310 may receive a second message 320 from the AP 302, and the second message 320 may instruct the AP 310 to operate in a reduced power mode when the measured energy level is greater than the first threshold energy level. In another example, the STA 314 may receive a third message 324 from the AP 310, and the third message 324 may include a first threshold energy level and/or a second threshold energy level. In another example, the STA 314 may receive a fourth message 326 from the AP 310, and the fourth message 326 may instruct the STA 314 to operate in a reduced power mode when the measured energy level is greater than the first threshold energy level.

At block 510, the apparatus may measure the energy level of the transmission channel. In one example, referring to FIG. 3, the AP 310 may measure the energy level of the transmission channel. The AP 310 may measure the energy level of the transmission channel by measuring the energy level of detected interference sources and/or Wi-Fi transmissions. In another example, the STA 314 may measure the energy level of the transmission channel. The STA 314 may measure the energy level of the transmission channel by measuring the energy level of the detected interference sources and/or Wi-Fi transmissions. The measurement may also be based on an existing noise floor and/or ambient energy.

At block 515, the apparatus may compare the measured energy level to the first threshold energy level. The first threshold energy level may correspond to a first state of the transmission channel. In one example, referring to FIG. 3, the AP 310 may compare the measured energy level to the first threshold energy level. In another example, the STA 314 may compare the measured energy level to the first threshold energy level.

At block 520, the apparatus may compare the measured energy level to the second threshold energy level. The second threshold energy level may correspond to a second state of the transmission channel. The second threshold energy level may be greater than the first threshold energy level. In one example, referring to FIG. 3, the AP 310 may compare the measured energy level to the second threshold energy level. In another example, the STA 314 may compare the measured energy level to the second threshold energy level.

At block 525, the apparatus may determine whether to transmit data in the transmission channel based on the comparison performed in block 520. The determination may also be based on the comparison performed in block 515. In one aspect, when the measured energy level is less than or equal to the first threshold energy level, the apparatus may determine to transmit the data at an initial transmission power in the transmission channel. In another aspect, when the measured energy level is greater than the first threshold energy level, but less than the second threshold energy level, the apparatus may reduce the transmission power and transmit the data in the transmission channel at the reduced transmission power. The reduced transmission power may be a function of the difference between the measured energy level and the first threshold energy level. In yet another aspect, when the measured energy level is greater than the second threshold energy level, the apparatus may refrain from transmitting the data in the transmission channel. In one example, referring to FIG. 3, having measured the energy level of the transmission channel and compared the measured energy level with the first threshold energy level, the AP 310 may determine that the measured energy level is less than the first threshold energy level. As such, the AP 310 may transmit data to the STA 314 at the initial transmission power. In another example, having measured the energy level of the transmission channel and compared the measured energy level with the first threshold energy level, the AP 310 may determine that the measured energy level is greater than the first threshold energy level. In this example, the measured energy level may be −60 dB and the first threshold energy level may be −62 dB. The AP 310 may determine to reduce transmission power by 2 dB and transmit data to the STA 314 at the reduced transmission power. In yet another example, having measured the energy level of the transmission channel and compared the measured energy level with the second threshold energy level, the AP 310 may determine that the measured energy level (e.g., −48 dB) is greater than the second threshold energy level (e.g., −50 dB). The AP 310 may determine to refrain from transmitting data to the STA 314 based on the comparison between the measured energy level and the second threshold energy level.

In another configuration, the determination of whether to transmit data may include determining a SINR at a second wireless device to which the data is to be transmitted. The apparatus may transmit the data in the transmission channel at the reduced transmission power when the SINR is greater than a threshold. In another configuration, the determination of whether to transmit data may include determining an expected MCS index at the second wireless device to which the data is to be transmitted. The apparatus may transmit the data at the reduced power when the expected MCS index is greater than a threshold. In yet another configuration, the determining whether to transmit data may include comparing the reduced transmission power to a minimum power threshold. The apparatus may transmit the data at the reduced transmission power in the transmission channel only when the reduced transmission power is greater than the minimum power threshold. In one example, referring to FIG. 3, the AP 310 may determine that the SINR at the STA 314 is less than a threshold and refrain from transmitting to the STA 314. In another example, the AP 310 may determine that the expected MCS index at the STA 314 is greater than a threshold and decide to transmit to the STA 314. In yet another example, the AP 310 may determine that the reduced transmission power is less than the minimum power threshold and decide to refrain from transmitting to the STA 314.

In another configuration, the determination of whether to transmit data is based on only the measured energy level, even when a preamble is received from another wireless device in an OBSS. For example, referring to FIG. 3, the AP 310 may receive a Wi-Fi signal preamble 316 from the AP 306. The Wi-Fi signal preamble 316 may indicate that the AP 306 is transmitting on a transmission channel on which the AP 310 would like to transmit. Despite receiving the Wi-Fi signal preamble 316, the AP 310 may determine to transmit data to the STA 314 in the same transmission channel with reduced transmission power.

Although block 525 has been discussed from the point of view of an AP performing various blocks, block 525, and the various related configurations discussed with respect to block 525, also applies to a STA (e.g., the STA 314).

Figure 6:
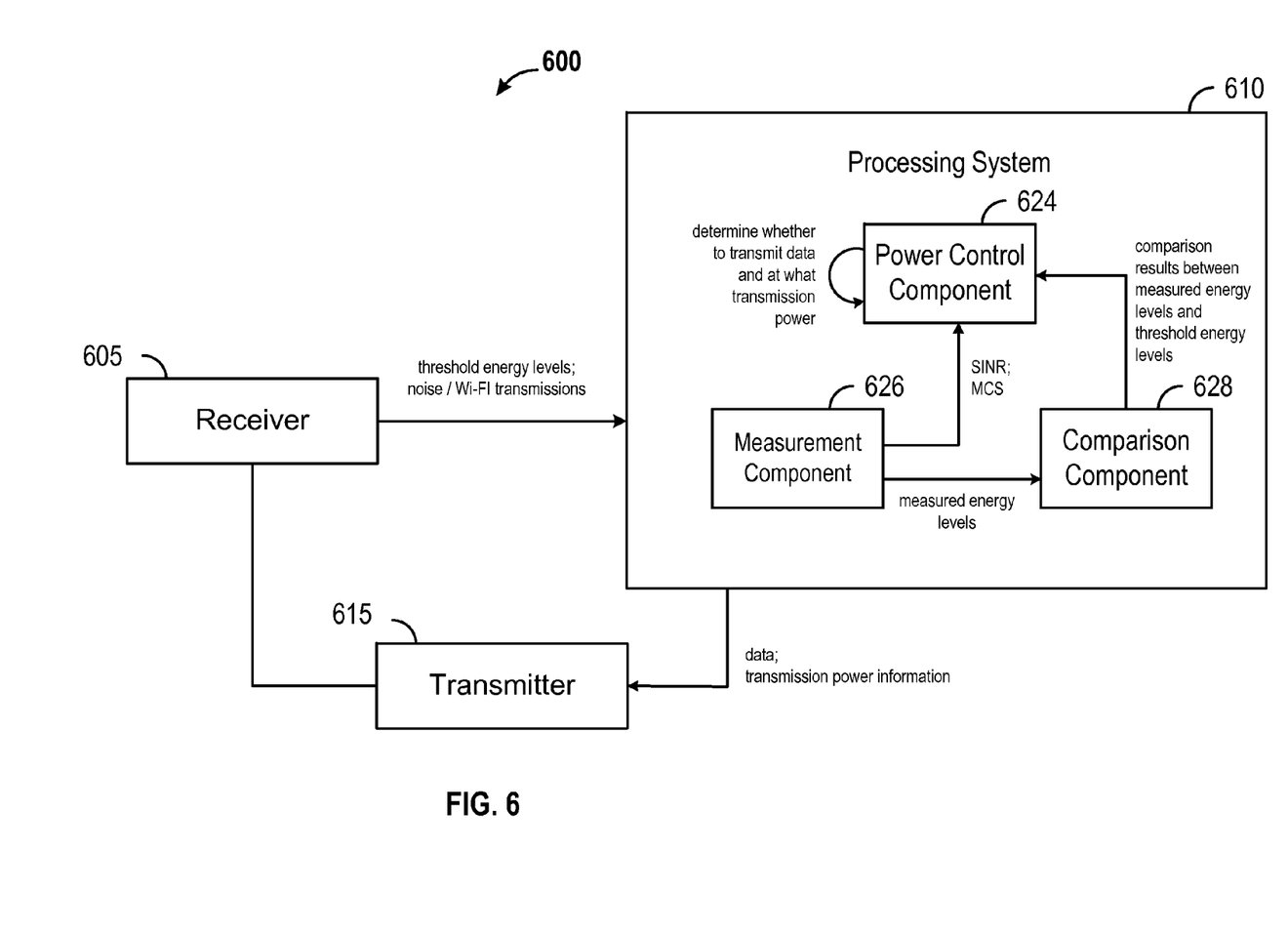
FIG. 6 is a functional block diagram of an example wireless communication device configured for power control.

FIG. 6 is a functional block diagram of an example wireless communication device 600 configured for power control. The wireless communication device 600 may include a receiver 605, a processing system 610, and a transmitter 615. The processing system 610 may include a power control component 624, a measurement component 626, and/or a comparison component 628. The processing system 610, the power control component 624, the measurement component 626, and/or the receiver 605 may be configured to measure an energy level of a transmission channel. The processing system 610, the comparison component 628, and/or the power control component 624 may be configured to compare the measured energy level to a first threshold energy level. The first threshold energy level may correspond to a first state of the transmission channel. The processing system 610, the power control component 624, and/or the transmitter 615 may be configured to determine whether to transmit data in the transmission channel based on the comparison. In one aspect, when the measured energy level is greater than the first threshold energy level, the processing system 610, the power control component 624, and/or the transmitter 615 may reduce a transmission power of the wireless communication device 600 and transmit the data in the transmission channel at the reduced transmission power. The reduced transmission power may be a function of a difference between the measured energy level and the first threshold energy level.

The processing system 610, the comparison component 628, and/or the power control component 624 may be configured to compare the measured energy level to a second threshold energy level. The second threshold energy level may correspond to a second state of the transmission channel, and the second threshold energy level may be greater than the first threshold energy level. In one aspect, when the measured energy level is less than or equal to the threshold energy level, the processing system 610, the power control component 624, and/or the transmitter 615 may be configured to transmit the data in the transmission channel at an initial transmission power. In another aspect, when the measured energy level is greater than the first threshold energy level and less than the second threshold energy level, the processing system 610, the power control component 624, and/or the transmitter 615 may be configured to transmit the data in the transmission channel at the reduced transmission power. In yet another aspect, when the measured energy level is greater than the second threshold energy level, the processing system 610, the power control component 624, and/or the transmitter 615 may be configured to refrain from transmitting the data in the transmission channel.

In one configuration, the processing system 610, the power control component 624, the measurement component 626, and/or the receiver 605 may be configured to determine a SINR at a second wireless device to which the data is to be transmitted. In this configuration, the processing system 610, the power control component 624, and/or the transmitter 615 may be configured to transmit the data in the transmission channel at the reduced transmission power when the SINR is greater than a threshold.

In another configuration, the processing system 610, the power control component 624, the measurement component 626, and/or the receiver 605 may be configured to determine an expected MCS index at the second wireless device to which the data is to be transmitted. In this configuration, the processing system 610, the power control component 624, and/or the transmitter 615 may be configured to transmit the data in the transmission channel at the reduced transmission power when the expected MCS index is greater than a threshold.

In another configuration, the processing system 610, the comparison component 628, and/or the power control component 624 may be configured to compare the reduced transmission power to a minimum threshold. In this configuration, the processing system 610, the power control component 624, and/or the transmitter 615 may be configured to transmit the data at the reduced transmission power in the transmission channel only when the reduced transmission power is greater than the minimum power threshold.

In another configuration, the processing system 610, and/or the power control component 624 may be configured to determine whether to transmit data based on the measured energy level even when a preamble is received from another wireless device in an OBSS.

In another configuration, the processing system 610, the power control component 624, and/or the receiver 605 receives a message. The message may include at least one of the first threshold energy level, the second threshold energy level, or instructions for the wireless communication device 600 to operate in a reduced power mode when the measured energy level is greater than the first threshold energy level. In an aspect, the message may be received in a beacon message or a management frame.

The receiver 605, the processing system 610, the power control component 624, and/or the transmitter 615 may be configured to perform one or more functions discussed above with respect to blocks 505, 510, 515, 520, and 525 of FIG. 5. The receiver 605 may correspond to the receiver 412. The processing system 610 may correspond to the processor 404. The transmitter 615 may correspond to the transmitter 410. The power control component 624 may correspond to the power control component 124, the power control component 126, and/or the power control component 424.

In one configuration, the wireless communication device 600 includes means for measuring an energy level of a transmission channel. The wireless communication device 600 includes means for comparing the measured energy level to a first threshold energy level. The first threshold energy level may correspond to a first state of the transmission channel. The wireless communication device 600 includes means for determining whether to transmit data in the transmission channel based on the comparison. The measured energy level may be greater than the first threshold energy level, and the means for determining may be configured to reduce a transmission power of the wireless communication device 600 and to transmit the data in the transmission channel at the reduced transmission power. In an aspect, the reduced transmission power may be a function of a difference between the measured energy level and the first threshold energy level. In another configuration, the wireless communication device 600 may include means for comparing the measured energy level to a second threshold energy level. The second threshold energy level may corresponds to a second state of the transmission channel. In this configuration, the determination to transmit the data in the transmission channel at the reduced transmission power may be based on the measured energy level being greater than the first threshold energy level and less than the second threshold energy level. Further, the determination to refrain from transmitting the data in the transmission channel may be based on the measured energy level being greater than the second threshold energy level. In another configuration, the means for determining may be configured to determine a SINR at a second wireless device to which the data is to be transmitted and to transmit the data in the transmission channel at the reduced transmission power when the SINR is greater than a threshold. In another configuration, the means for determining may be configured to determine an expected MCS index at a second wireless device to which the data is to be transmitted and to transmit the data in the transmission channel at the reduced transmission power when the expected MCS index is greater than a threshold. In another configuration, the means for determining may be configured to compare the reduced transmission power to a minimum power threshold and to transmit the data at the reduced transmission power in the transmission channel when the reduced transmission power is greater than the minimum power threshold. In another aspect, the measured energy level may be less than or equal to the first threshold energy level. In this aspect, the means for determining may be configured to transmit the data at an initial transmission power in the transmission channel. In another configuration, the determination of whether to transmit the data is based on the measured energy level even when a preamble is received from another wireless device in an overlapping basic service set. In another configuration, the wireless communication device 600 may include means for receiving a message. The message may include at least one of the first threshold energy level, a second threshold energy level, or instructions for the wireless communication device 600 to operate in a reduced power mode when the measured energy level is greater than the first threshold energy level. In another aspect, the message may be received in a beacon message or a management frame. The aforementioned means may be one or more of the aforementioned components of the wireless communication device 600 and/or the processing system 610 of the wireless communication device 600 configured to perform the functions recited by the aforementioned means. For example, means for measuring an energy level of a transmission channel may comprise the processing system 610, the measurement component 626, and/or the power control component 624. Means for comparing the measured energy level to a first threshold energy level may comprise the processing system 610, the comparison component 628, and/or the power control component 624. Means for determining whether to transmit data in the transmission channel based on the comparison may comprise the processing system 610, the power control component 624, and/or the transmitter 615. Means for comparing the measured energy level to a second threshold energy level may comprise the processing system 610, the comparison component 628, and/or the power control component 624. Means for receiving may comprise the processing system 610, the power control component 624, and/or the receiver 605.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a wireless device, comprising:
   measuring an energy level of a transmission channel on which the wireless device wants to transmit data, the transmission channel being used by at least one other wireless device;
   comparing the measured energy level to a first threshold energy level, wherein the first threshold energy level corresponds to a first state of the transmission channel and to an energy detection threshold level associated with a clear channel assessment;
   determining whether to transmit the data in the transmission channel based on the comparison of the measured energy level to the first threshold energy level, wherein a determination to transmit the data in the transmission channel is based on the measured energy level being greater than the first threshold energy level; and
   transmitting the data in the transmission channel at a reduced transmission power based on when the measured energy level of the transmission channel exceeds the energy detection threshold level of the clear channel assessment indicating that the transmission channel is busy,
   wherein the data is transmitted at the reduced transmission power in the transmission channel to increase transmission channel reuse in a wireless local area network (WLAN).

2. The method of claim 1,
   wherein the reduced transmission power is a function of a difference between the measured energy level and the first threshold energy level, and the first threshold energy level is associated with the WLAN associated with the wireless device.

3. The method of claim 1, further comprising comparing the measured energy level to a second threshold energy level, wherein the second threshold energy level corresponds to a second state of the transmission channel,
   wherein the determination to transmit the data in the transmission channel is further based on the measured energy level being greater than the first threshold energy level and less than the second threshold energy level, and
   wherein a determination to refrain from transmitting the data in the transmission channel is based on the measured energy level being greater than the second threshold energy level.

4. The method of claim 1, wherein the determining further comprises determining a signal to interference plus noise ratio (SINR) at a second wireless device to which the data is to be transmitted; and
   wherein the transmitting comprises transmitting the data in the transmission channel at the reduced transmission power based on when the measured energy level of the transmission channel exceeds the energy detection threshold level of the clear channel assessment indicating that the transmission channel is busy and based on when the SINR is greater than a threshold.

5. The method of claim 1, wherein the determining further comprises determining an expected modulation and coding scheme (MCS) index at a second wireless device to which the data is to be transmitted; and
   wherein the transmitting comprises transmitting the data in the transmission channel at the reduced transmission power based on when the measured energy level of the transmission channel exceeds the energy detection threshold level of the clear channel assessment indicating that the transmission channel is busy and based on when the expected MCS index is greater than a threshold.

6. The method of claim 1, wherein the determining further comprises comparing the reduced transmission power to a minimum power threshold; and wherein the transmitting comprises transmitting the data in the transmission channel at the reduced transmission power based on when the measured energy level of the transmission channel exceeds the energy detection threshold level of the clear channel assessment indicating that the transmission channel is busy and based on when the reduced transmission power is greater than the minimum power threshold.

7. The method of claim 1, wherein the determining whether to transmit the data is based on the measured energy level even when a preamble is received from another wireless device in an overlapping basic service set.

8. The method of claim 1, further comprising receiving a message, wherein the message comprises at least one of the first threshold energy level, a second threshold energy level, or instructions for the wireless device to operate in a reduced power mode when the measured energy level is greater than the first threshold energy level.

9. The method of claim 8, wherein the message is received in a beacon message or a management frame.

10. An apparatus for wireless communication, comprising:
means for measuring an energy level of a transmission channel on which the apparatus wants to transmit data, the transmission channel being used by at least one other wireless device;
means for comparing the measured energy level to a first threshold energy level, wherein the first threshold energy level corresponds to a first state of the transmission channel and to an energy detection threshold level associated with a clear channel assessment;
means for determining whether to transmit the data in the transmission channel based on the comparison of the measured energy level to the first threshold energy level, wherein a determination to transmit the data in the transmission channel is based on the measured energy level being greater than the first threshold energy level; and
means for transmitting the data in the transmission channel at a reduced transmission power based on when the measured energy level of the transmission channel exceeds the energy detection threshold level of the clear channel assessment indicating that the transmission channel is busy,
wherein the data is transmitted at the reduced transmission power in the transmission channel to increase transmission channel reuse in a wireless local area network (WLAN).

11. The apparatus of claim 10,
wherein the reduced transmission power is a function of a difference between the measured energy level and the first threshold energy level, and the first threshold energy level is associated with a wireless local area network (WLAN) associated with the apparatus.

12. The apparatus of claim 10, further comprising means for comparing the measured energy level to a second threshold energy level, wherein the second threshold energy level corresponds to a second state of the transmission channel,
wherein the determination to transmit the data in the transmission channel is further based on the measured energy level being greater than the first threshold energy level and less than the second threshold energy level, and
wherein a determination to refrain from transmitting the data in the transmission channel is based on the measured energy level being greater than the second threshold energy level.

13. The apparatus of claim 10, wherein the means for determining is further configured to determine a signal to interference plus noise ratio (SINR) at a wireless device to which the data is to be transmitted; and
wherein the means for transmitting is configured to transmit the data in the transmission channel at the reduced transmission power based on when the measured energy level of the transmission channel exceeds the energy detection threshold level of the clear channel assessment indicating that the transmission channel is busy and based on when the SINR is greater than a threshold.

14. The apparatus of claim 10, wherein the means for determining is further configured to determine an expected modulation and coding scheme (MCS) index at a wireless device to which the data is to be transmitted; and
wherein the means for transmitting is configured to transmit the data in the transmission channel at the reduced transmission power based on when the measured energy level of the transmission channel exceeds the energy detection threshold level of the clear channel assessment indicating that the transmission channel is busy and based on when the expected MCS index is greater than a threshold.

15. The apparatus of claim 10, wherein the means for determining is further configured to compare the reduced transmission power to a minimum power threshold; and
wherein the means for transmitting is configured to transmit the data in the transmission channel at the reduced transmission power based on when the measured energy level of the transmission channel exceeds the energy detection threshold level of the clear channel assessment indicating that the transmission channel is busy and based on when the reduced transmission power is greater than the minimum power threshold.

16. The apparatus of claim 10, wherein the means for determining is configured to determine whether to transmit the data based on the measured energy level even when a preamble is received from another wireless device in an overlapping basic service set.

17. The apparatus of claim 10, further comprising means for receiving a message, wherein the message comprises at least one of the first threshold energy level, a second threshold energy level, or instructions for the apparatus to operate in a reduced power mode when the measured energy level is greater than the first threshold energy level.

18. An apparatus for wireless communication, comprising:
a memory; and
at least one processor coupled to the memory, wherein the at least one processor is configured to:
measure an energy level of a transmission channel on which the apparatus wants to transmit data, the transmission channel being used by at least one other wireless device;
compare the measured energy level to a first threshold energy level, wherein the first threshold energy level corresponds to a first state of the transmission channel and to an energy detection threshold level associated with a clear channel assessment;
determine whether to transmit the data in the transmission channel based on the comparison of the measured energy level to a first threshold energy level, wherein a determination to transmit the data in the transmission channel is based on the measured energy level is greater than the first threshold energy level; and transmit the data in the transmission channel at a reduced transmission power based on when the measured energy level of the transmission channel exceeds the energy detection threshold level of the clear channel assessment indicating that the transmission channel is busy,
wherein the data is transmitted at the reduced transmission power in the transmission channel to increase transmission channel reuse in a wireless local area network (WLAN).

19. The apparatus of claim 18,
wherein the reduced transmission power is a function of a difference between the measured energy level and the first threshold energy level, and the first threshold energy level is associated with a wireless local area network (WLAN) associated with the apparatus.

20. The apparatus of claim 18, wherein the at least one processor is further configured to compare the measured energy level to a second threshold energy level, wherein the second threshold energy level corresponds to a second state of the transmission channel,
wherein the determination to transmit the data in the transmission channel is further based on the measured energy level being greater than the first threshold energy level and less than the second threshold energy level, and
wherein a determination to refrain from transmitting the data in the transmission channel is based on the measured energy level being greater than the second threshold energy level.

21. The apparatus of claim 18, wherein the at least one processor is configured to:
determine a signal to interference plus noise ratio (SINR) at a wireless device to which the data is to be transmitted; and
transmit the data in the transmission channel at the reduced transmission power based on when the measured energy level of the transmission channel exceeds the energy detection threshold level of the clear channel assessment indicating that the transmission channel is busy and based on when the SINR is greater than a threshold.

22. The apparatus of claim 18, wherein the at least one processor is configured to:
determine an expected modulation and coding scheme (MCS) index at a wireless device to which the data is to be transmitted; and
transmit the data in the transmission channel at the reduced transmission power based on when the measured energy level of the transmission channel exceeds the energy detection threshold level of the clear channel assessment indicating that the transmission channel is busy and based on when the expected MCS index is greater than a threshold.

23. The apparatus of claim 18, wherein the at least one processor is configured to:
compare the reduced transmission power to a minimum power threshold; and
transmit the data in the transmission channel at the reduced transmission power based on when the measured energy level of the transmission channel exceeds the energy detection threshold level of the clear channel assessment indicating that the transmission channel is busy and based on when the reduced transmission power is greater than the minimum power threshold.

24. The apparatus of claim 18, wherein the determination of whether to transmit the data is based on the measured energy level even when a preamble is received from another wireless device in an overlapping basic service set.

25. The apparatus of claim 18, wherein the at least one processor is configured to receive a message, wherein the message comprises at least one of the first threshold energy level, a second threshold energy level, or instructions for the apparatus to operate in a reduced power mode when the measured energy level is greater than the first threshold energy level.

26. The apparatus of claim 25, wherein the message is received in a beacon message or a management frame.

27. A non-transitory computer-readable medium having code stored thereon that, when executed, causes a wireless device to:
measure an energy level of a transmission channel on which the wireless device wants to transmit data, the transmission channel being used by at least one other wireless device;
compare the measured energy level to a first threshold energy level, wherein the first threshold energy level corresponds to a first state of the transmission channel and to an energy detection threshold level associated with a clear channel assessment;
determine whether to transmit the data in the transmission channel based on the comparison of the measured energy level to a first threshold energy level, wherein a determination to transmit the data in the transmission channel is based on the measured energy level being greater than the first threshold energy level; and
transmit the data in the transmission channel at a reduced transmission power based on when the measured energy level of the transmission channel exceeds the energy detection threshold level of the clear channel assessment indicating that the transmission channel is busy,
wherein the data is transmitted at the reduced transmission power in the transmission channel to increase transmission channel reuse in a wireless local area network (WLAN).

28. The apparatus of claim 17, wherein the message is received in a beacon message or a management frame.

* * * * *